United States Patent Office 3,502,650
Patented Mar. 24, 1970

3,502,650
D-GLUCOFURANO IMIDAZOLINES
Charles Morel, Arlesheim, Switzerland, assignor to Geigy Chemical Corporation, Ardsley, N.Y., a corporation of New York
No Drawing. Continuation-in-part of application Ser. No. 461,185, June 3, 1965. This application Mar. 14, 1968, Ser. No. 712,969
Claims priority, application Switzerland, June 9, 1964, 7,494/64
Int. Cl. C07d 99/04, 49/34; A61k 27/00
U.S. Cl. 260—211.5                                10 Claims

ABSTRACT OF THE DISCLOSURE

Phenyl substituted 3-phenyl-4,5-D-glucofurano-$\Delta^1$-imidazolines are prepared from 2-thiono-3-phenyl-4,5-D-glucofurano-imidazolidines or 2-alkylthio-3-phenyl-4,5-D-glucofurano-$\Delta^1$-imidazolines; these compounds as well as pharmaceutically acceptable acid addition salts thereof have antiinflammatory, analgesic and antipyretic properties; methods for treatment of inflammatory diseases and therapeutical compositions containing said compounds are provided; an illustrative embodiment is 3-(3,4-dichlorophenyl)-4,5-D-glucofurano-$\Delta^1$-imidazoline.

CROSS REFERENCE TO RELATED APPLICATIONS

This is a continuation-in-part of our copending patent application Ser. No. 461,185, filed June 3, 1965 and now abandoned.

DETAILED DISCLOSURE

The present invention concerns imidazoline derivatives and their pharmaceutically acceptable acid addition salts, methods for treating inflammatory diseases and therapeutic compositions containing such imidazoline derivatives and/or acid addition salts thereof.

More specifically, the present invention pertains to substituted glucofurano-$\Delta^1$-imidazolines of Formula I

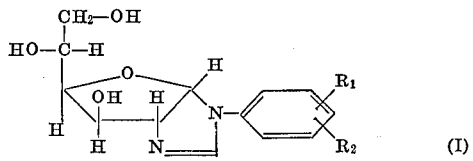

(I)

wherein $R_1$ is hydrogen, lower alkyl, lower alkoxy, fluoro, chloro, or bromo and
$R_2$ is lower alkyl, lower alkoxy, fluoro, chloro or bromo; and pharmaceutically acceptable acid addition salts thereof.

Compounds of this invention are prepared by treating a compound of Formula II,

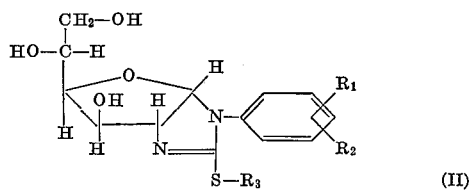

(II)

wherein $R_1$ and $R_2$ have the meanings given above and
$R_3$ is hydrogen or lower alkyl, with a hydrogenation catalyst in the presence of a lower alkanol.

In case $R_3$ is hydrogen, the compound of Formula II, used as starting material in the above reaction, can be in its tautomeric form as a thione.

Examples of a lower alkanol and a catalyst are ethanol and Raney nickel respectively. The reaction is carried out at temperatures between 65° and 120°, preferably at the boiling temperature of the alkanol. An excess of the alkanol can serve as reaction medium.

By the term "lower alkyl" and derivations thereof utilizing the root "alk," such as lower alkanol and lower alkoxy is intended to mean a group comprising a branched or straight hydrocarbon chain containing from one to four carbon atoms. Representative of lower alkyl groups are thus, e.g. methyl, ethyl, isopropyl or tert. butyl. Representative of lower alkoxy groups are, e.g. methoxy, ethoxy, n-propoxy, isopropoxy or n-butoxy.

The substituents $R_1$ and $R_2$ are preferably in the 3- and 4-position of the phenyl ring.

Starting materials of Formula II wherein $R_3$ is hydrogen can be produced by reacting D-glucosamine with a correspondingly substituted phenyl isothiocyanate in alkanols, for example in ethanol, at elevated temperatures, followed by exposing the intermediate reaction product to ring closing conditions, for example, by adding a small amount of sulfuric acid to the reaction solution containing such intermediate reaction product and boiling for a short time. Cyclisation can also be achieved by first isolating the intermediate reaction product, for example, by distilling off the solvent, and heating it with aqueous, e.g. 20%, acetic acid to about 50–100°. Compounds of Formula II thus formed are isolated, optionally after removal of the acidic catalyst, by evaporating the reaction medium and recrstallisation of the residue, e.g. from water or ethanol/water mixtures.

Starting materials of Formula II wherein $R_3$ is slower alkyl are obtained by heating an alkali metal salt of a compound of Formula II wherein $R_3$ is hydrogen with reactive esters of lower alkanols, e.g. with lower alkyl halides, in a suitable inert organic solvent such as dimethylformamide Acid addition salts of compounds of Formula I are prepared via conventional methods, e.g. by dissolving equimolar amounts of the free base and the acid in a suitable solvent, for example, in water, a lower alkanol etc. Examples of acids forming pharmaceutically acceptable acid addition salts with compounds of Formula I are hydrochloric acid, methane sulfonic acid, ethane sulfonic acid, ethane disulfonic acid, $\beta$-hydroxyethane sulfonic acid, acetic acid, succinic acid, fumaric acid, maleic acid, lactic acid, malic acid, tartaric acid, citric acid, benzoic acid, salicylic acid, mandelic acid and embonic acid.

The novel imidazoline derivatives of Formula I and the pharmaceutically acceptable acid addition salts thereof have valuable pharmacological properties, in particular antiinflammatory, analgesic and antipyretic activities.

The antiinflammatory activities of the compounds of the invention are illustratively demonstrated by the following test:

Into each member of a group of 13 rats weighing between 120 and 150 g. is injected intraperitoneally 200 mg. per kg. of bodyweight of the substance to be tested. Five minutes thereafter 0.1 ml. of a 3% aqueous formalin solution is injected into one hind paw of each of the test animals. The animals are sacrificed two hours thereafter and the extent of the swelling is determined by measuring the weight differences of the paws treated with formalin solution and of the untreated paws.

Another group of rats (control group), having not obtained the test substance, is treated the same way with the formalin solution and the extent of swelling is determined as in the first group.

The change of the average weight difference of the hind paws of the first group versus the average weight difference of the hind paws of the control group is a measure for the anti-inflammatory activity.

Thus it is shown that 3-(3,4-dichlorophenyl)-4,5-D-glucofurano - Δ¹ - imidazoline, 3-(4-chlorophenyl)-4,5-D-glucofurano - Δ¹ - imidazoline and 3-(3-chloro-4-methylphenyl)-4,5-D-glucofurano-Δ¹-imidazoline in a dose of 200 mg./kg. i.p. reduce swelling to a very significant extent.

The analgesic activity of the compounds of the invention are illustratively demonstrated in white mice according to the method of Gross [Helv. Physiol. Pharmac. Acta. 5, C31 (1947)] with the apparatus according to Friebel and Reichle [Arch. exp. Path. u. Pharmakol. 226, 551 (1955)].

Thus it is shown that 3-(3,4-dichlorophenyl)-4,5-D-glucofurano-Δ¹-imidazoline and 3-(3-chloro - 4 - methylphenyl)-4,5-D-glucofurano-Δ¹-imidazoline in a dose of 150 mg./kg. i.p. have a very significant analgesic activity. The acute toxicity of the compounds of the invention as demonstrated in mice per os is of very low order.

The anti-inflammatory activity of the compounds of the invention in combination with their analgesic activity and their low toxicity render them suitable for the relief of pain and simultaneously for the treatment of various inflatmmatory conditions, such as rheumatoid arthritis and spondylitis, painful shoulder and gout in a mammal. For their intended uses the compounds of the invention are administered in amounts depending on the species, age and weight of the subject under treatment as well as on the particular condition to be treated and the mode of administration. Generally the daily doses vary between about 5 and 100 mg./kg. on oral administration and between about 5 and 50 mg./kg. on parenteral administration.

Compounds of Formula I are administered orally, rectally or, in form of aqueous solutions of their acid addition salts, also parenterally. Dosage units, such as tablets, dragees and suppositories contain preferably about 25–500 mg. of active ingredient. Ampoules contain preferably about 20–250 mg. of a pharmaceutically acceptable salt of the active ingredient in aqueous solution.

Dosage units for oral administration preferably contain between 1 and 90% of a compound of Formula I or at least one of its pharmaceutically acceptable acid addition salts as active ingredients. Such dosage units are produced by combining the active substance with, e.g., solid, pulverulent carriers such as lactose, saccharose, sorbitol, mannitol; starches such as potato starch, maize starch or amylopectin, also laminaria powder or citrus pulp powder; cellulose derivatives or gelatines, optionally with the addition of lubricants such as magnesium or calcium stearate or polyethylene glycols (Carbowax) of suitable molecular weights, and pressing the mixture into tablets or dragee cores.

The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can also be added to these coatings, e.g. to distinguish between various dosages of active substance.

Examples of dosage units for rectal administration are suppositories which consist of a combination of a compound of Formula I with a neutral fatty foundation, or also gelatine rectal capsules which containing a combination of a compound of Formula I with polyethylene glycols (Carbowax) of a suitable molecular weight.

Ampoules for parenteral, in particular intramuscular, administration contain a pharmaceutically acceptable, water soluble salt of a compound of Formula I in a concentration of preferably 1–5%, optionally together with suitable stabilising agents and buffer substances, in aqueous solution.

The following examples further illustrate the production of the new compounds and the starting materials therefor, as well as the production of therapeutic compositions containing these compounds as active ingredients.

EXAMPLE 1

(A) Preparation of compounds of Formula II wherein $R_3$ is H (a) A mixture of 3.6 g. of D-glucosamine, 4.4 g. of 3,4-dichlorophenylisothiocyanate and 10 ml. of abs. ethanol is heated under exclusion of moisture up to 50–60° for about 30 minutes until a homogenous solution is obtained. The solvent is evaporated in vacuo and the residue is heated with 20 ml. of 20% acetic acid on a boiling water bath for about one hour. Some charcoal is added and heating is continued for about 10 minutes. The hot solution is filtered, then cooled whereupon 2-thiono-3-(3,4 - dichlorophenyl) - 4,5 - D - glucofuranoimidazolidine crystallises. The crystals are collected and recrystallised from water; M.P. 185–186°; $[\alpha]_D^{22}$: +72.1° (c.=1.09; DMF).

(b) A mixture of 2.2 g. of D-glucosamine, 2.7 g. of 3,4-dichlorophenylisothiocyanate and 10 ml. of abs. ethanol are heated as described above. After 30 minutes 10 ml. of ethanol and 3 drops of concentrated sulfuric acid are added and the reaction solution is refluxed for one hour. Amberlite IR4B (OH⁻ -form) is added to the cooled reaction solution to neutralize the sulfuric acid. The ion exchanger is filtered off, the filtrate is concentrated in vacuo and the residue recrystallised from water. The same compound as described under (A)(a) is obtained.

The following condensation products of D-glucosamine are obtained in analogous manner as described under (A)(a) or (A)(b).

2-thiono-3-(4-chlorophenyl)-4,5-D-glucofurano-imidazolidine from 4-chlorophenyl isothiocyanate;
2-thiono-3-(3,4-dimethylphenyl)-4,5-D-glucofurano-imidazolidine from 3,4-dimethylphenyl isothiocyanate;
2-thiono-3-(4-methylphenyl)-4,5-D-glucofurano-imidazolidine from 3-chloro-4-methylphenyl isothiocyanate;
2-thiono-3-(4-methoxyphenyl)-4,5-D-glucofurano-imidazolidine from 4-methoxy-phenyl isothiocyanate;
2-thiono-3-(2-chlorophenyl)-4,5-D-glucofurano-imidazolidine from 2-chlorophenyl isothiocyanate.

(B) Preparation of compounds of Formula II wherein $R_3$ is lower alkyl (a) A mixture of 2.75 g. of 2-thiono-3-(3,4-dichlorophenyl)-4,5-D-glucofurano-imidazolidine and 17.43 ml. of a 0.43 N alcoholic potassium hydroxide solution is stirred for about 15 minutes at room temperature whereupon the starting material dissolves. A short time thereafter its potassium salt precipitates. The crystal slurry is evaporated in vacuo to dryness and the residue dissolved in 37.5 ml. of dimethylformamide. This solution is stirred with 0.6 ml. of ethyliodide for 3 hours at 90° and evaporated in vacuo to dryness. The viscous residue is triturated with 30 ml. of water, the solid precipitate formed is filtered off, washed with water, dried and recrystallised from acetonitrile to give 2-ethylthio-3-(3,4-dichlorophenyl)-4,5-D - glucofurano-Δ¹-imidazoline; M.P. 163–164° (dec.).

The same compound is obtained using 0.75 ml. of ethyl bromide instead of 0.6 ml. of ethyl iodide.

The following compounds can be prepared in analogous manner.

Starting from 2-thiono-3-(4-chlorophenyl)-4,5-D-glucofurano-imidazolidine the 2-ethylthio-3-(4-chlorophenyl)-4,5-D-glucofurano-Δ¹-imidazoline;
Starting from 2-thiono-3-(3,4-dimethylphenyl)-4,5-D-glucofurano-imidazolidine the 2-ethylthio-3-(3,4-dimethylphenyl)-4,5-D-glucofuranoΔ¹-imidazoline;
Starting from 2-thiono-3-(4-methylphenyl)-4,5-D-glucofurano-imidazolidine the 2-ethyl-thio-3-(3-chloro- 4-methylphenyl)-4,5-D-glucofurano-Δ¹-imidazoline;
Starting from 2-thiono-3-(4-methoxyphenyl)-4,5-D-glucofurano-imidazolidine the 2-ethylthio-3-(4-methoxyphenyl)-4,5-D-glucofurano-Δ¹-imidazoline;
Starting from 2-thiono-3-(2-chlorophenyl)-4,5-D-glucofurano-Δ¹-imidazolidine the 2-ethylthio-3-(2-chlorophenyl)-4,5-D-glucofurano-Δ¹-imidazoline.

(C) Preparation of compounds of Formula I (a) A mixture of 1 g. of 2-thiono-3-(3,4-dichlorophenyl)-4,5-D-glucofurano-imiaazolidine, 7.5 g. of Raney nickel (alcohol moist) and 15 ml. of ethanol is stirred and refluxed for 30 minutes. The catalyst is filtered off and washed with ethanol. The combined filtrates are concentrated in vacuo and the residue is recrystallised from 25% ethanol to give 3-(3,4-dichlorophenyl)-4,5-D-glucofurano-Δ¹-imidazoline; M.P. 204–206°; $[\alpha]_D^{22}$: +251.8° (c.=1.00; pyridine).

(b) The same compound is obtained is 1 g. of 2-ethylthio-3-(3,4-dichlorophenyl)-4,5-D-glucofurano - Δ¹-imidazoline is treated the same way as described under (C)(a).

In analogous manner as described under C. a) or C. b) starting from either the correspondingly substituted 2-thiono or 2-ethylthio derivatives, the following compounds are prepared.

3-(4-chlorophenyl)-4,5-D-glucofurano-Δ¹-imidazoline;
  M.P. 142–143°; $[\alpha]_D^{23}$: +251.9° (c.=1.03; pyridine);
3-(3,4-dimethylphenyl)-4,5-D-glucofurano-Δ¹-imidazoline; M.P. 161–163°; $[\alpha]_D^{23}$: +214.1° (c.= 1.01; pyridine);
3-(4-methylphenyl)-4,5-D-glucofurano-Δ¹-imidazoline;
  M.P. 173–175°; $[\alpha]_D^{23}$: +226.3° (c.=0.96; pyridine);
3-(3-chloro-4-methylphenyl)-4,5-D-glucofurano-Δ¹-imidazoline; M.P. 179–181°; $[\alpha]_D^{23}$: +225.9° (c.= 1.05; pyridine);
3-(4-methoxyphenyl)-4,5-D-glucofurano-Δ¹-imidazoline;
  M.P. 150–152°; $[\alpha]_D^{23}$: +213.3° (c.=1.03; pyridine);
3-(2-chlorophenyl)-4,5-D-glucofurano-Δ¹-imidazoline;
  M.P. 143–1450; $[\alpha]_D^{23}$: +119.4° (c.=1.07; pyridine).

EXAMPLE 2

To 250 g. of active ingredient, e.g. 3-(3,4-dichlorophenyl)-4,5-D - glucofurano - Δ¹ - imidazoline, is carefully admixed 175.80 g. of lactose and 169.70 g. of potato starch. The mixture is moistened with an alcoholic solution of 10 g. of stearic acid and granulated through a sieve. The granulate is dried and carefully mixed with 160 g. of potato starch, 200 g. of talcum powder, 2.50 g. of magnesium stearate and 32 g. of colloidal silicon dioxide. The mixture is pressed into 10,000 tablets each weighing 100 mg. and containing 25 mg. of active ingredient. If desired, the tablets can be grooved for better adaptation of the dosage.

EXAMPLE 3

To 250 g. of active ingredient, e.g. 3-(3,4-dichlorophenyl)-4, 5-D - glucofurano - Δ¹ - imidazoline, is homogenously admixed 175.9 g. of lactose and an alcoholic solution of 10 g. of stearic acid. The mixture is granulated through a sieve and dried. The granulate is mixed with 56.60 g. of colloidal silicon dioxide, 165 g. of talcum powder, 20 g. of potato starch and 2.50 g. of magnesium stearate. The mixture is pressed into 10,000 dragee cores which are then coated with a concentrated syrup made from 502.28 g. of crystallised saccharose, 200 g. of talcum, 6 g. of shellac, 10 g. of gum arabic, 0.22 g. of dyestuff and 1.50 g. of titanium dioxide and dried. The dragees obtained each weigh 140 mg. and contain 25 mg. of active ingredient.

EXAMPLE 4

To 1950 g. of finely grinded suppository base, e.g. cocoa butter, is homogenously admixed 50 g. of active ingredient, e.g. 3-(3,4-dichlorophenyl)-4,5-D-glucofurano - Δ¹ - imidazoline. The mixture is molten, stirred to keep it homogenous, and cast into 1000 suppositories each weighing 2 g. and containing 50 mg. of active ingredient.

EXAMPLE 5

A suspension of 20 g. of active ingredient, e.g. the free base of 3-(3,4-dichlorophenyl)-4,5 - D - glucofurano - Δ¹-imidazoline, in 100 ml. of sterile pyrogen free water, is dissolved in 1 mol. equivalent of 1 N hydrochloric acid and filled up to 2000 ml. with sterile pyrogen free water. The solution is filtered, filled into 1000 ampoules of each 2 ml. and sterilised. Each ampoule contains 20 mg. of active ingredient.

What is claimed is:
1. A compound of the formula

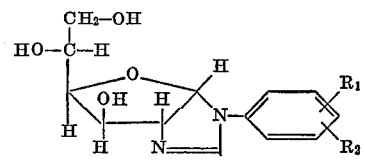

wherein
  $R_1$ is hydrogen, lower alkyl, lower alkoxy, fluoro, chloro, or bromo and
  $R_2$ is lower alkyl, lower alkoxy, fluoro, chloro or bromo.
2. A pharmaceutically acceptable acid addition salt of a compound as defined in claim 1.
3. A compound as defined in claim 1, wherein said compound is 3-(3,4-dichlorophenyl)-4,5-D - glucofurano-Δ¹-imidazoline.
4. A compound as defined in claim 1, wherein said comound is 3-(3-chloro-4-methylphenyl) - 4,5 - D - glucofurano-Δ¹-imidazoline.
5. A compound as defined in claim 1, wherein said compound is 3-(4-chlorophenyl)-4,5-D - glucofurano-Δ¹-imidazoline.
6. A compound as defined in claim 1, wherein said compound is 3-(4-chlorophenyl)-4,5-D-glucofurano - Δ¹-imidazoline.
7. A compound as defined in claim 1, wherein said compound is 3-(3,4-methylphenyl)-4,5-D-glucofurano-Δ¹-Δ¹-imidazoline.
8. A compound as defined in claim 1, wherein said compound is 3-(4-methylphenyl)-4,5-D - glucofurano-Δ¹-imidazoline.
9. A compound as defined in claim 1, wherein said compound is 3-(4-methoxyphenyl)-4,5-D-glucofurano-Δ¹-imidazoline.
10. A compound as defined in claim 1, wherein said compound is 3-(2-chlorophenyl)-4,5-D - glucofurano - Δ¹-imidazoline.

References Cited

UNITED STATES PATENTS 3,304,299   3/1967   Morel _____ 260—211.5

LEWIS GOTTS, Primary Examiner

JOHNNIE R. BROWN, Assistant Examiner

U.S. Cl. X.R.

424—180

UNITED STATES PATENT OFFICE
CERTIFICATE OF CORRECTION

Patent No. 3,502,650                                       March 24, 1970

Charles Morel

It is certified that error appears in the above identified patent and that said Letters Patent are hereby corrected as shown below:

Column 2, line 32, "slower" should read -- lower --. Column 3, line 25, "inflatmmatory" should read -- inflammatory --; line 64, "containing" should read -- contain --. Column 5, line 19, "is", second occurrence, should read -- if --; line 41, "1450" should read -- 145° --. Claim 4, "comound" should read -- compound --. Claim 7, that portion of the chemical name reading "3,4-methylphenyl" should read -- 3,4-dimethylphenyl --.

Signed and sealed this 25th day of August 1970.

(SEAL)
Attest:

Edward M. Fletcher, Jr.                      WILLIAM E. SCHUYLER, JR.
Attesting Officer                                         Commissioner of Patents